Sept. 15, 1942. D. E. VARNER 2,296,195
SUPPORT FOR EXPANSION JOINT FILLERS, REINFORCING RODS, AND DOWEL BARS
Filed July 10, 1940 3 Sheets-Sheet 1
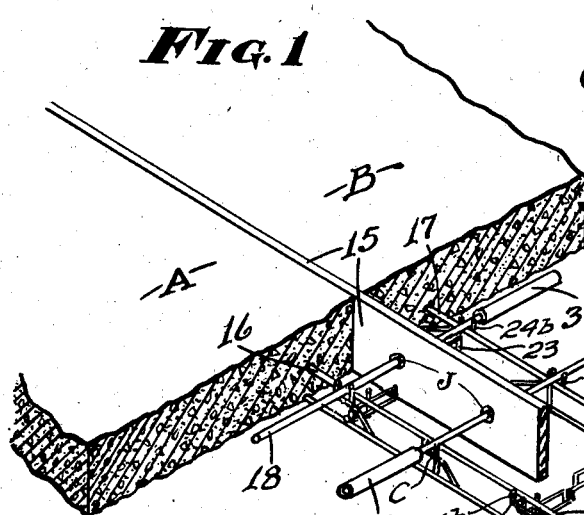
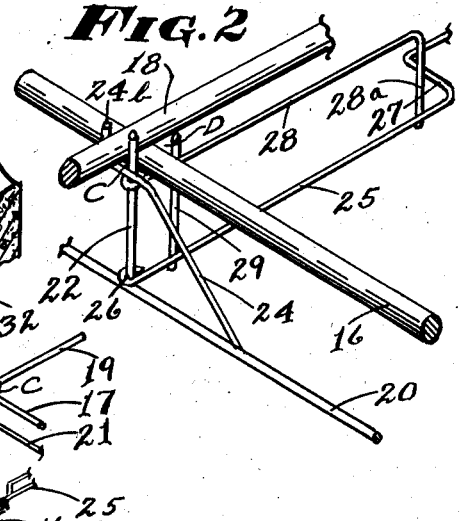
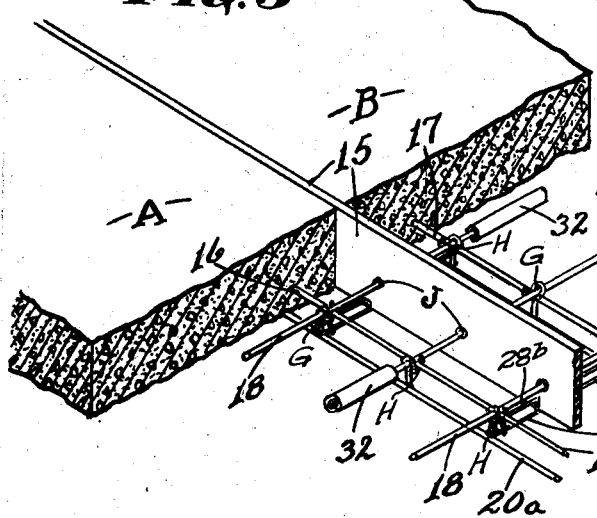
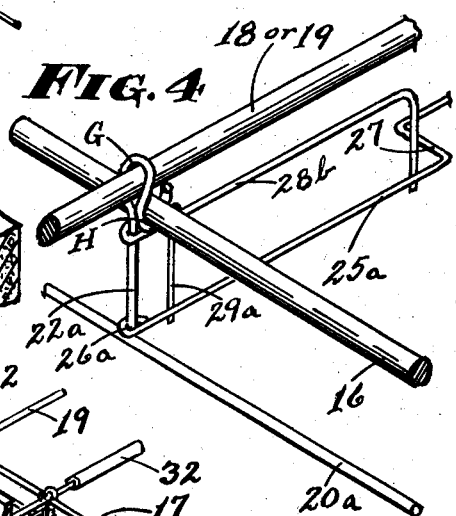
INVENTOR.
David E. Varner
BY M. Y. Charles
ATTORNEY.

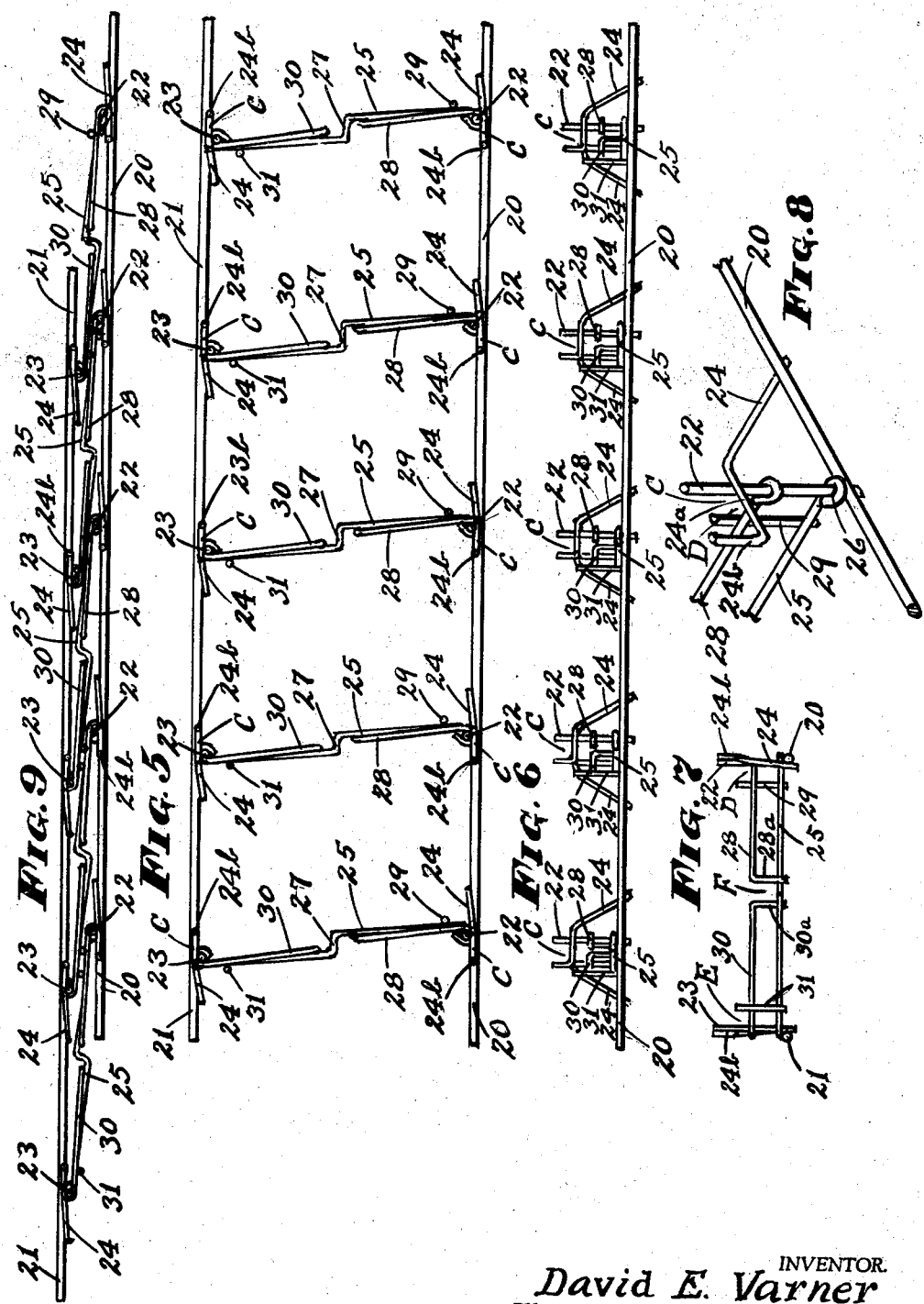

Sept. 15, 1942. D. E. VARNER 2,296,195
SUPPORT FOR EXPANSION JOINT FILLERS, REINFORCING RODS, AND DOWEL BARS
Filed July 10, 1940 3 Sheets-Sheet 3
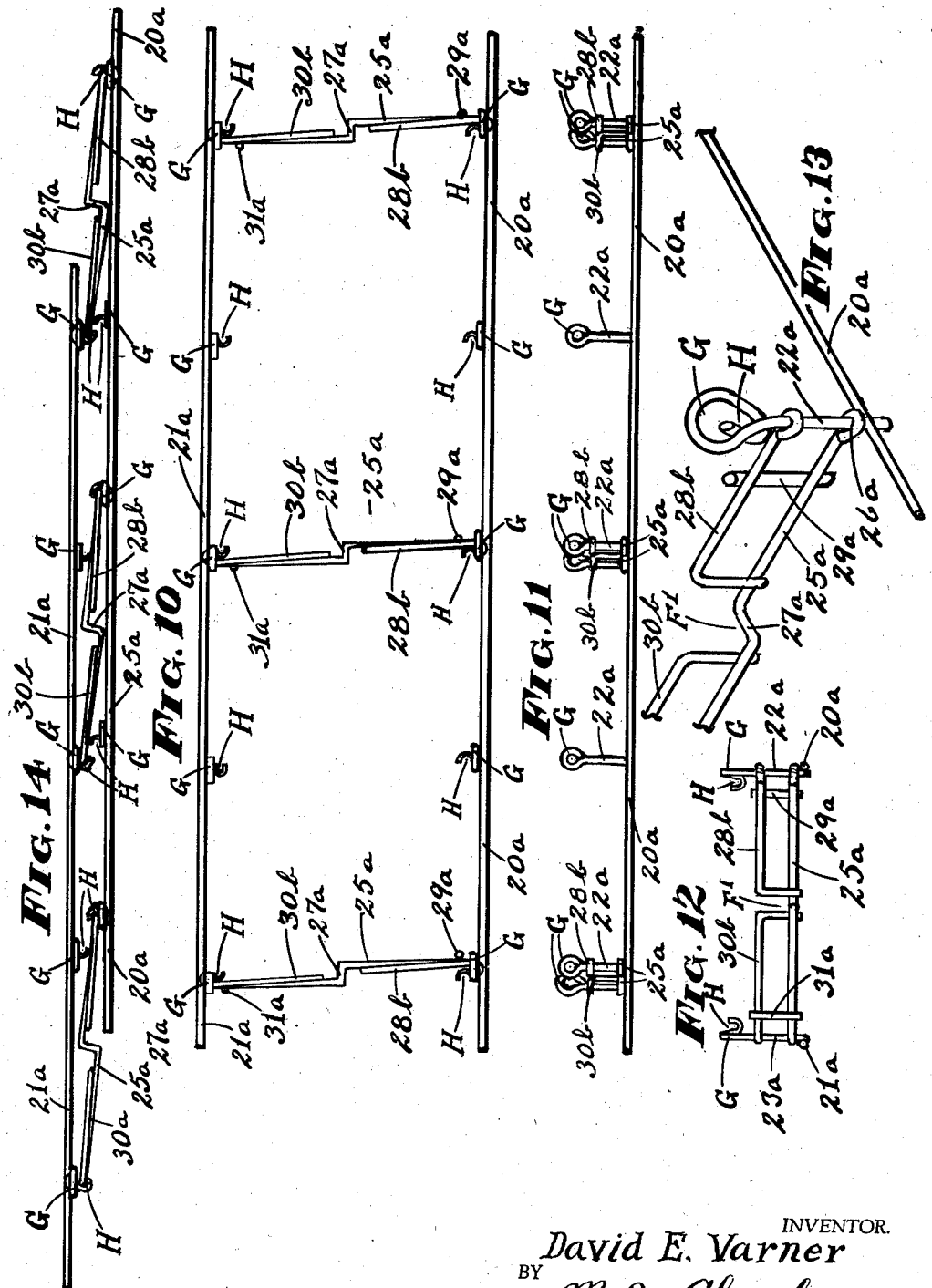
INVENTOR.
David E. Varner
BY M. Y. Charles
ATTORNEY.

Patented Sept. 15, 1942

2,296,195

UNITED STATES PATENT OFFICE 2,296,195

SUPPORT FOR EXPANSION JOINT FILLERS, REINFORCING RODS, AND DOWEL BARS

David E. Varner, Wichita, Kans.

Application July 10, 1940, Serial No. 344,758

3 Claims. (Cl. 94—8)

My invention relates to an improvement in dowel bar supports for concrete paving and the like. The object of my improved dowel bar support is to provide a support that is light in weight, cheap and easy to make.

A further object is to provide a dowel bar support of the kind mentioned that will support reinforcing and dowel bars that are positioned substantially at right angles to each other.

A still further object is to provide a support of the kind mentioned that will support an expansion joint filler element on edge and at the same time support reinforcing bars for the concrete in positions equally spaced from the expansion joint filler element.

A still further object is to provide a dowel support element of the kind mentioned that will support the dowel bars and longitudinal reinforcing bars at a uniform depth in the concrete that is to be poured.

A still further object is to provide a dowel support device of the kind mentioned that may be collapsed for shipping and handling purposes.

These and other objects will be more fully explained as this description progresses.

Now referring to the accompanying drawings,

Fig. 1 is a perspective view of a piece of paving having an expansion joint therein and illustrating the application and use of the dowel support device.

Fig. 2 is an enlarged detail perspective view of one of the dowel bar supporting structures and showing a dowel bar and reinforcing rod in position in the support.

Fig. 3 is a detail perspective view of a piece of paving having an expansion joint therein and showing a modified form of the dowel and reinforcing bar support.

Fig. 4 is an enlarged detail perspective view of one of the dowel support elements such as is employed in the device shown in Fig. 3 and showing a dowel bar and reinforcing rod in position in the support.

Fig. 5 is a plan view of the dowel bar support device such as illustrated in Figs. 1 and 2.

Fig. 6 is a side view of the dowel bar support device shown in Fig. 5.

Fig. 7 is an end view of the dowel bar support device shown in Figs. 5 and 6.

Fig. 8 is an enlarged detail perspective view of one of the dowel bar supporting elements employed in the device shown in Figs. 1, 5, 6 and 7.

Fig. 9 is a plan view of the dowel bar support device shown in Fig. 5, except the device is collapsed for handling or transport purposes.

Fig. 10 is a plan view of the modified form of the dowel bar support device as illustrated in Figs. 3 and 4.

Fig. 11 is a side view of the device shown in Fig. 10.

Fig. 12 is an end view of the device shown in Figs. 10 and 11.

Fig. 13 is an enlarged detail perspective view of one of the dowel bar and reinforcing rod support elements as employed in the device shown in Figs. 3, 10, 11 and 12.

Fig. 14 is a plan view of the device shown in Fig. 10, except that the device is in a collapsed condition.

Similar numerals refer to the same parts throughout the several figures of the drawings.

In the drawings is shown pieces of concrete paving A and B, having an expansion joint filler 15, positioned therebetween. The concrete portion A having a longitudinally positioned reinforcing rod 16 positioned approximately in the middle thereof, and the concrete portion B similarly having a longitudinally positioned reinforcing rod 17 positioned approximately in the middle thereof.

At 18 and 19 is shown dowel bars positioned transverse to the longitudinal reinforcing bars 16 and 17, the reinforcing bars 16 and 17 and the dowel bars 18 and 19 being supported on the dowel support device, with the dowel bars 18 and 19 passing through holes in the expansion joint filler as will later be described.

In Fig. 3 is shown the same elements as described in Fig. 1 except that a modified form of the reinforcing rod and dowel bar support is employed.

The preferred form of the reinforcing rod and dowel rod support device comprises a pair of parallelly positioned wires 20 and 21, having standards 22 and 23 positioned at right angles thereto and being welded thereto.

Each of the standards 22 are provided with a brace element 24 that spans between the post 22 and the base wire 20 and are welded thereto to form a rigid base for the post 22. The brace element 24 continues on past the post 22 at substantially right angles thereto as at 24a and then continues at approximately right angles to its self as at 24b so as to make a U-shaped formation C between the post 21 and the portion 24b at a position spaced well above the base element 20.

At 25 is a link spanning between the base wires 20 and 21, the ends of which are turned around the post 22 at the point 26 so as to form a hinge connection to the posts 22 and 23 at the point 26 and rest on the base wires 20 and 21.

The center portion of the links 25 are bent so as to have a portion 27 that runs substantially at right angles to the balance of the link 25, the object of which will later be made obvious.

At 28 is a second wire spaced intermediate the link 25 and spaced below the horizontal portion 24a of the wire 24, one end of the wire 28 being turned around the post 22 to form a hinge connection thereto and the other end of the wire 28 being turned downwardly as at 28a and welded to the link 25, a short distance from the portion 27 of the link 25.

At 29 is a short piece of wire that is welded to both the link 25 and the wire 28 in a position parallel to the post 22 and spaced a short distance therefrom. With the upper end of the wire 29 extending above the wire 28 so as to form a U shaped opening D between the wires 29, 28 and the post 22. The U shaped opening D being spaced below the U shaped opening C.

At 30 is another wire, similar to the wire 28, one end of which is hingedly attached to the post 23, the other end being bent downwardly and welded to the link 25 in the same manner as described for the wire 28.

At 31 is another short wire that is positioned in relation to the post 23 the same as the wire 29 is positioned to the post 22, and forms a U shaped opening E that corresponds to the U shaped opening D.

The vertically positioned ends 30a and 28a of the wires 30 and 28 are spaced apart so as to form a U shaped opening F, the object of which will later be made obvious.

Now referring to the modified form of the device, shown in Figs. 3, 4, 10, 11, 12, 13, and 14.

The device comprises the parallelly positioned wires 20a and 21a which are provided with standard elements 22a and 23a that are welded to the base wire elements 20a and 21a respectively in a position substantially at right angles to the wires 20a and 21a. The upper ends of the standards 22a and 23a are provided with an eye formation G, that is positioned in parallelism with the base elements 20a and 21a and the formation of the wire then continuing to form a U shaped opening H that is positioned transverse to the eye formation G.

At 25a is a link spanning between the base wires 20a and 21a and is hingedly attached to the standards 22a and 23a as illustrated at the point 26a and having a transverse bend 27a as shown in Fig. 13, and at 28b and 30b are wires formed and attached to the link 25a and the posts 22a and 23a and having the support 29a and forming the U shaped opening F¹, all precisely the same as described for Figures 1, 2, 5, 6, 7, 8 and 9.

The operation of the device is as follows; The device may be collapsed for handling or shipping by pushing the base wires 20 and 21 in opposite directions, whereupon the hinge mountings of the link and associated elements to the posts 22 and 23 or 22a and 23a will revolve around the posts 22 and 23 or 22a and 23a to a collapsed position of the device as shown in Figs. 9 and 14.

Now when the device is to be used it is opened out as shown in Figs. 5 or 10 and the devices are placed end to end to form a continuous support for the expansion joint material, reinforcing rods and dowel bars, whereupon a strip of plastic material such as asphalt, tar or other suitable expansion joint material 15 is set edgeways in the U shaped openings F or F¹ and is supported in such a position by the vertically positioned legs 28a and 30a of the wires 28 and 30, as shown in Figs. 1 and 3. This having been done, the reinforcing rods 16 and 17 are placed in the U shaped openings D or H in a position parallel to the expansion joint 15 and equally spaced away therefrom and being supported above the ground so that the reinforcing rods 16 and 17 will be positioned uniformly between the top and bottom surfaces of the concrete slabs A and B that are to be poured. The reinforcing rods having thus been placed, the dowel bars 18 and 19 are positioned transversely of the reinforcing rods 16 and 17 by placing the rods in one of the U shaped openings C or one of the eyes G and sliding the rod end ways to the expansion joint material 15 and then passing the rod 18 or 19 through the hole J and then on through the opposite U shaped support C or eye G so that the ends of the dowel bars 18 or 19 project well beyond the reinforcing rods 16 and 17.

If the U shaped opening F or F¹ should be too narrow to receive the expansion joint filler element 15, the U shaped formation may be widened the desired amount by bending the portions 27 or 27a of the links 25 or 25a towards alignment with the rods 25 or 25a so as to move the vertical portions of the wires 28 and 30 or 28a and 30a apart so as to make room therebetween to receive the expansion joint filler element 15.

Some engineers in designing the reinforcing to be used in concrete paving have seen fit to place tubular elements 32 on the alternate ends of the successive dowel bars as shown in Figs. 1 and 3. Therefore the tubular elements 32 are shown in Figs. 1 and 3 merely as a conformity to some engineering principles.

The expansion joint material 15, reinforcing rods 16 and 17 and dowel bars 18 and 19, having been positioned as above described, the concrete A and B may be poured so that the upper surface of the slabs A and B is flush with the top edge of the expansion joint material 15 and the reinforcing bars 16 and 17 and the dowel bars 18 and 19 are properly positioned in the slabs A and B and the dowel bars 18 and 19 will function to prevent the surface of one of the slabs A or B from raising or lowering above the other as the slabs A and B expand or contract under variable temperatures.

Such modifications may be employed as lie within the scope of the appended claims without departing from the spirit and intention of the invention. Now having fully described my invention, I claim:

1. In a support for reinforcing rods and dowel bars; a pair of parallel base wires, vertically extending posts secured to said base wires in spaced relationship, link elements pivoted to the bottom portion of opposite posts and serving to hold said base wires in spaced apart position, holding means at the top of each post for supporting dowel bars in spaced position above and between the base wires, and spaced vertical wires secured intermediate the link elements for vertically supporting an expansion joint filler parallel to said base wires.

2. In a support for reinforcing rods and dowel bars as defined in claim 1, said link elements having a bent portion located between the spaced vertical wires whereby the spacing of said wires can be varied.

3. In a support for reinforcing rods and dowel bars as defined in claim 1, said posts also having means for supporting reinforcing rods that are placed in a transverse direction to the said dowel bars.

DAVID E. VARNER.